(12) United States Patent  (10) Patent No.:  US 7,226,170 B2
Hsu  (45) Date of Patent:  Jun. 5, 2007

(54) PROJECTOR WITH AIR CLEANING FUNCTIONALITY

(75) Inventor: Nien-Hui Hsu, Chunan (TW)

(73) Assignee: Coretronic Corporation (TW)

( * ) Notice: Subject to any disclaimer, the term of this patent is extended or adjusted under 35 U.S.C. 154(b) by 155 days.

(21) Appl. No.: 10/986,275

(22) Filed: Nov. 12, 2004

(65) Prior Publication Data

US 2006/0061735 A1    Mar. 23, 2006

(30) Foreign Application Priority Data

Sep. 17, 2004  (TW) .............................. 93128322 A

(51) Int. Cl.
  *G03B 21/16*  (2006.01)
  *G03B 21/18*  (2006.01)
  *H04N 5/74*  (2006.01)
  *G02F 1/1333*  (2006.01)
  *F21V 29/00*  (2006.01)
  *F21V 7/20*  (2006.01)

(52) U.S. Cl. ............................ 353/52; 353/55; 353/56; 353/57; 353/60; 353/61; 348/748; 349/161; 362/264; 362/294; 362/345; 362/373

(58) Field of Classification Search .................. 353/52, 353/55–58, 60, 61; 348/748; 349/161; 362/264, 362/294, 345, 373, 547, 580; 352/146, 202
See application file for complete search history.

(56) References Cited

U.S. PATENT DOCUMENTS 6,103,111 A  *  8/2000  Kakamu et al. ............. 210/167
2002/0140907 A1 * 10/2002  Fujimori ...................... 353/31

FOREIGN PATENT DOCUMENTS

JP        2003-195420      *   7/2003

OTHER PUBLICATIONS

Translation of JP Patent No. 2003-195420.*

* cited by examiner

*Primary Examiner*—W. B. Perkey
*Assistant Examiner*—Rochelle Blackman

(57) ABSTRACT

A projector with air cleaning functionality is equipped with a negative ion generator. The negative ion generator is positioned along a cooling airflow route of the projector and is adjacent to a lamp module. A photo-catalyst sheet, which is stimulated by ultraviolet light emitted from the lamp module, can produce the negative ions quickly. The air, which is circulated along the cooling airflow route, carries the negative ions out of the projector so as to clean air in the surroundings.

10 Claims, 3 Drawing Sheets

PROJECTOR WITH AIR CLEANING FUNCTIONALITY

RELATED APPLICATIONS

The present application is based on, and claims priority from, Taiwan Application Serial Number 93128322, filed Sep. 17, 2004, the disclosure of which is hereby incorporated by reference herein in its entirety.

BACKGROUND OF THE INVENTION

1. Field of Invention

The invention relates to a projector and, in particular, to a projector with air cleaning functionality.

2. Related Art

Projectors are often used in a dark room to project a clear image on a screen. To avoid outdoor light from entering the room, screens are usually used on doors and windows to block the light. However, at the same time, there is no indoor airflow. If many people or smokers gather in such a room, there may be uncomfortable odors, dusts, and bacteria that will harm human bodies.

SUMMARY OF THE INVENTION

Therefore, an objective of the invention is to provide a projector with air cleaning functionality to clean air in a room where the projector is used.

The disclosed projector with air cleaning functionality adds a negative ion generator in the conventional projector. The negative ion generator is positioned along a cooling airflow route and is adjacent to a lamp module. A photo-catalyst sheet, which is stimulated by ultraviolet light emitted from the lamp module, can produce the negative ions quickly. The air, which is circulated along the cooling airflow route, carries the negative ions out of the projector so as to clean air in the surroundings.

BRIEF DESCRIPTION OF THE DRAWINGS

These and other features, aspects and advantages of the invention will become apparent by reference to the following description and accompanying drawings which are given by way of illustration only, and thus are not limitative of the invention, and wherein.

DETAILED DESCRIPTION OF THE PREFERRED EMBODIMENT

The present invention will be apparent from the following detailed description, which proceeds with reference to the accompanying drawings, wherein the same references relate to the same elements.

Figure 1:
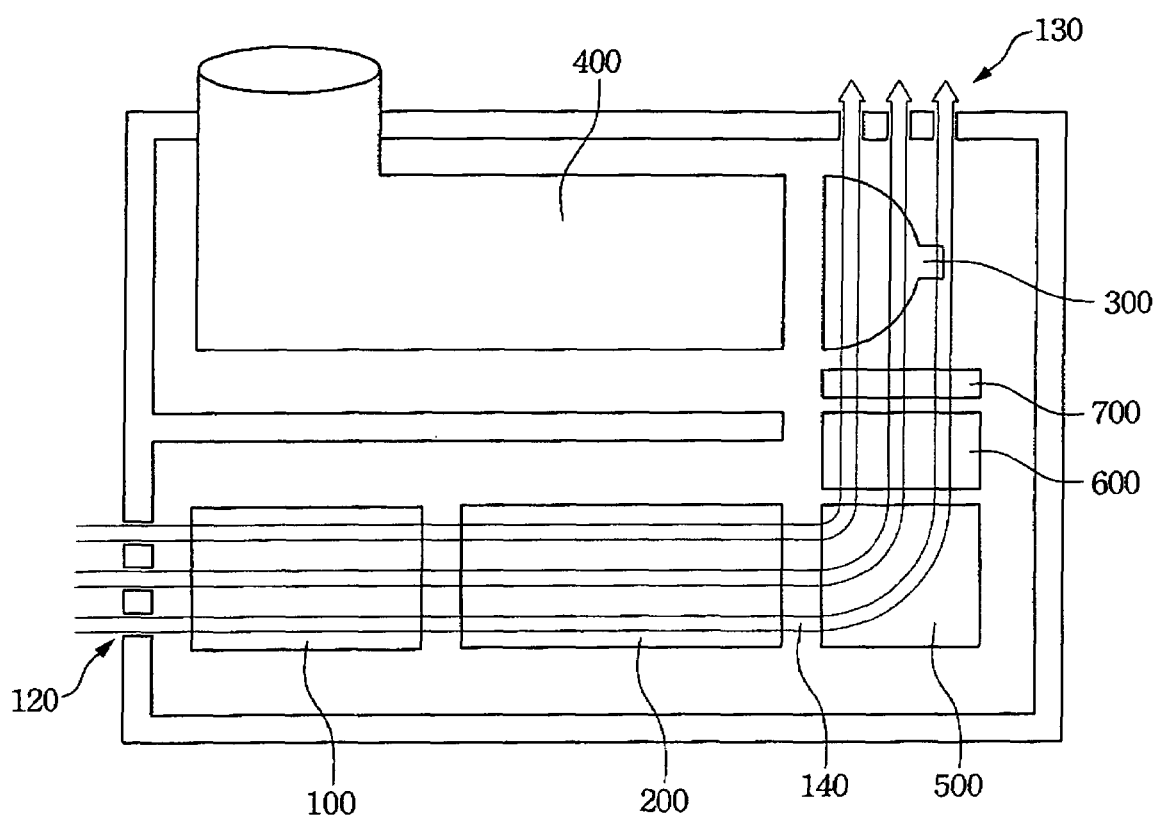
FIG. 1 is a schematic view of a projector with air cleaning functionality according to a preferred embodiment of the invention.

FIG. 1 shows the projector with air cleaning functionality according to a preferred embodiment of the invention. As shown in the drawing, it contains a power supply part 100, a signal processing part 200, a lamp module 300, an optics processing part 400, a control part 500, a cooling device 600, and a photo catalyst 700. The power supply part 100 provides the necessary power for each part of the projector. The signal processing part 200 converts an entered electrical signal into an projection image signal. The lamp module 300 provides a projecting light source. The optics processing part 400 projects the image signal processed by the signal processing part 200 using light emitted by the lamp module 300 onto a screen. The cooling device 600 sends air outside the projector into the projector through an air inlet 120 as cooling air. After absorbing heat generated by the projector, the heated cooling air is guided outside the projector through an air outlet 130. Thus, a cooling air route 140 is formed along the air inlet 120. the cooling device 600 and the air outlet 130. The cooling device 600 can be a fan. The control part 500 automatically or manually control various changes in each of the above-mentioned parts. The photo catalyst 700 featured in the invention is on the cooling air route 140 produced by the cooling device 600 and is adjacent to the lamp module 300. The photo-catalyst 700, which is stimulated by ultraviolet (UV) light emitted from the lamp module, produces negative ions quickly. The air, which is circulated along the cooling air route 140, carries the negative ions out of the projector so as to clean air in the surroundings.

Figure 2:
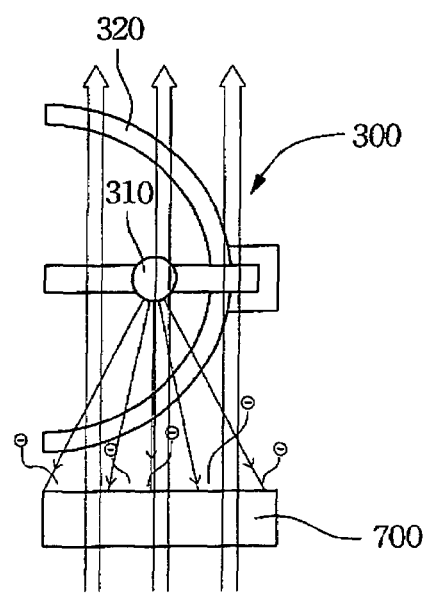
FIG. 2 is an exploded view of the part in the vicinity of the photo catalyst in FIG. 1.

FIG. 2 is an exploded view of the part in the vicinity of the negative ion generator in FIG. 1. As shown in the drawing, the lamp module 300 contains a projecting light bulb 310 and a reflective lamp shade 320. The lamp module 300 emits light from the projecting light bulb 310. The reflective lamp shade 320 collects the light and emit visible light from its opening. The projecting light bulb 310 also emits invisible UV light that penetrates through the reflective lamp shade 320. Generally speaking, a 300W light bulb can produce more than 15W UV light. The photo-catalyst sheet, which is stimulated by ultraviolet (UV) light emitted from the lamp module, produces extremely active negative ions. The negative ions first exhaust energy of organic gaseous molecules in order to quickly decompose odor molecules, dusts or bacteria in the air, thereby cleaning air in the surroundings.

Figure 3:
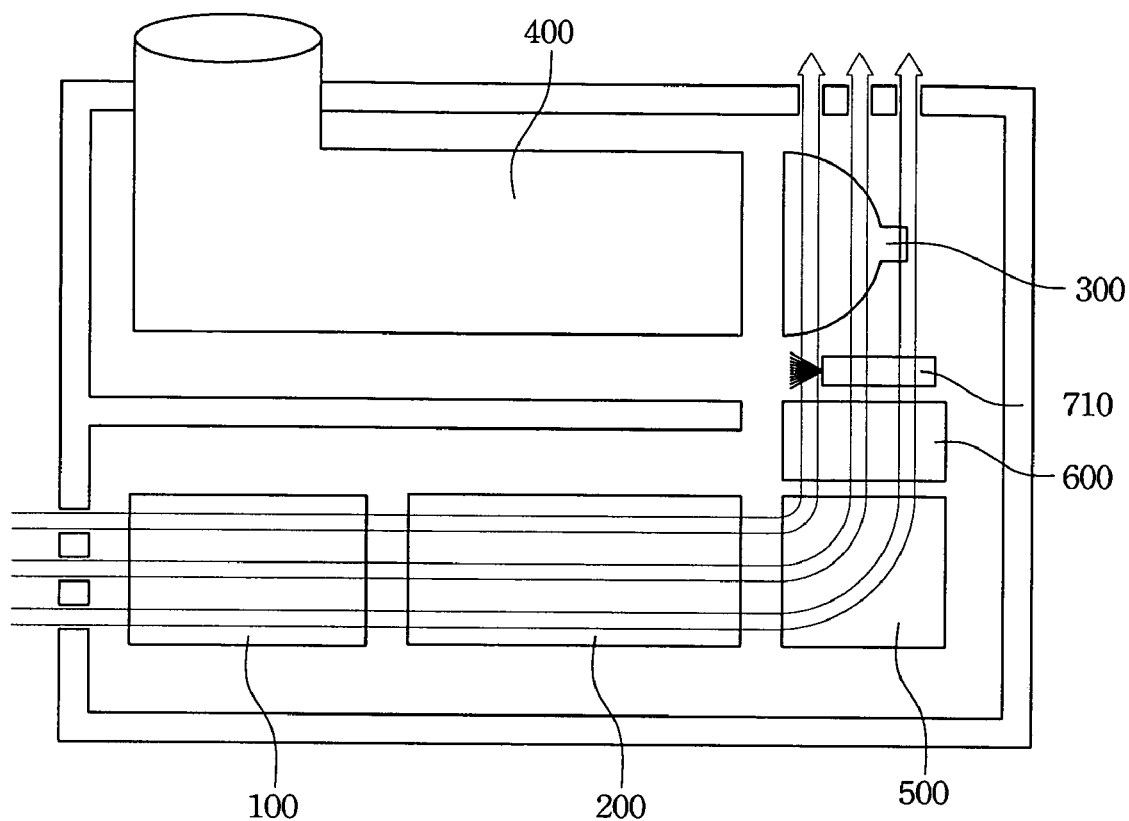
FIG. 3 is a schematic view of a projector with air cleaning functionality according to another embodiment of the invention.
Figure 4:
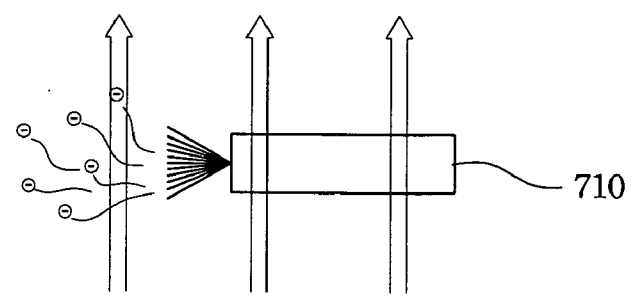
FIG. 4 is an exploded view of the part in the vicinity of the photo catalyst in FIG. 3.
Figure 5:
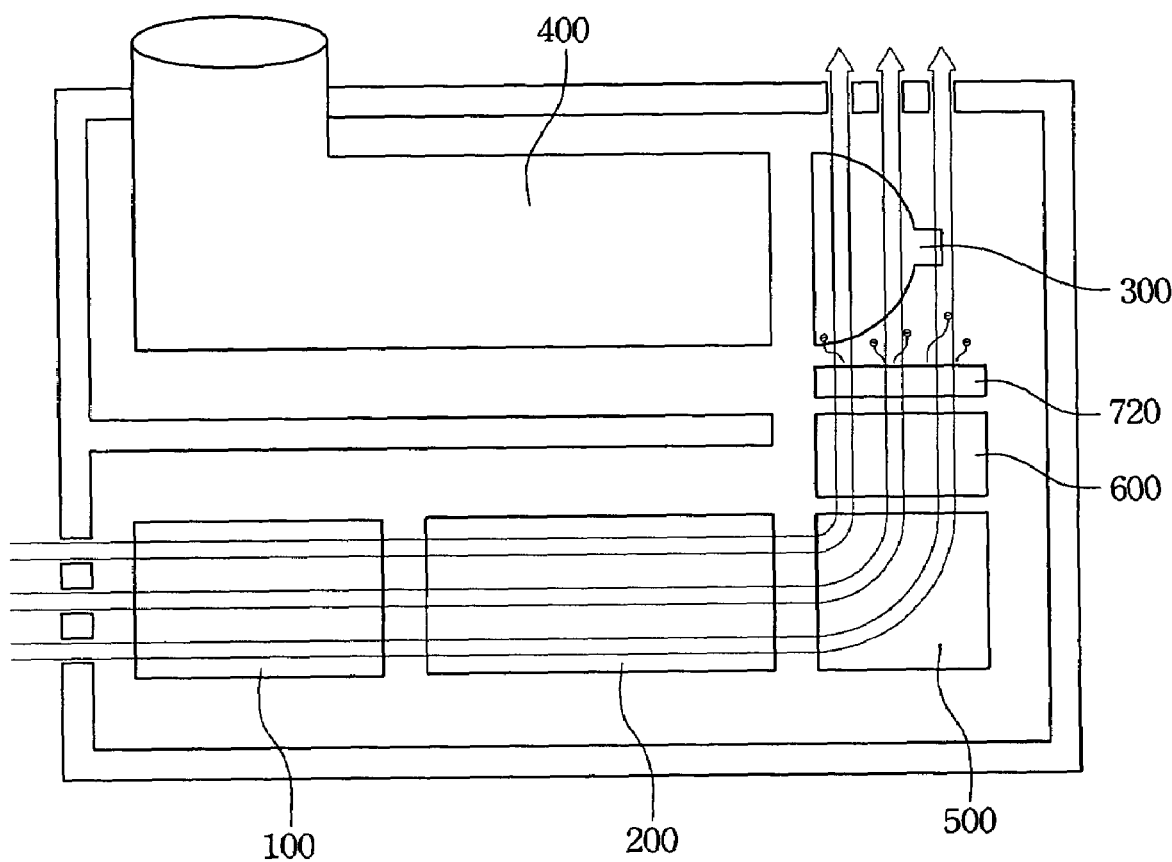
FIG. 5 is a schematic view a projector with air cleaning functionality according to yet another embodiment of the invention.

The invention may have various kinds of embodiments within its scope. For example, commonly seen photo catalyst materials include: $TiO_2$, TiO, ZnO, $SnO^2$, and CdS. $TiO^2$, in particular, is nontoxic and has superior oxidation and reduction abilities and chemical stability. Thus, it is a more ideal photo catalyst. In FIGS. 1 and 2, we use the photo catalyst to speed up the production of negative ions. In addition, one can includes a negative ion generator inside the projector. As shown in FIGS. 3 and 4, an electrical negative ion generator 710 is employed. When a voltage is imposed on the electrical negative ion generator 710, the front tips of the fibers first release negative ions. The voltage is provided by the power supply part 100. The control part 500 automatically or manually controls the production of the negative ions. As shown in FIG. 5, an electrical stone 720 is used as the negative ion generator. The electrical stone is a natural negative ion generator that permanently release negative ions without the need to impose a voltage or shining UV light thereon. Variations of such kinds should be considered as part of the invention.

1. From the described preferred embodiment, one sees that the invention has the following advantages:

2. Negative ions are released to surrounding air from a projector in use to clean indoor air.

The UV light produced by the light bulb and penetrating through the reflective lamp shade, which is originally ignored completely, is used to increase the production of negative ions. The negative ions are then used to decompose odor molecules, dusts and bacteria in the air, thus cleaning the air.

While the invention has been described by way of example and in terms of the preferred embodiment, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A projector with air cleaning functionality, comprising:
   a lamp module comprising a reflective lamp shade and a projecting light bulb, wherein the reflective lamp shade collects the light emitted from the projecting light bulb to emit visible light, and the projecting light bulb also radiates invisible ultraviolet (UV) light penetrating through the reflective lamp shade;
   an optics processing part for using the light emitted from the lamp module to project an image signal onto a screen;
   a cooling device for guiding air outside the projector into the projector through an air inlet as cooling air to absorb heat generated inside the projector and sending heated cooling air out of the projector through an air outlet so as to form a cooling air route; and
   a photo catalyst material, disposed inside the projector, the lamp module being positioned between the photo catalyst material and the air outlet along the cooling air route and the photo catalyst material being adjacent to the lamp module, wherein the UV light emitted by the projecting light bulb shines on the photo catalyst material.

2. The projector with air cleaning functionality of claim 1, wherein the photo catalyst material is selected from the group comprising $TiO_2$, TiO, ZnO, $SnO_2$, and CdS.

3. The projector with air cleaning functionality of claim 1, wherein the cooling device is a fan for the photo catalyst material to be installed thereon.

4. The projector with air cleaning functionality of claim 1 further comprising a power supply, a signal processing part, and a control part.

5. The projector with air cleaning functionality of claim 1, wherein the photo catalyst material is positioned between the lamp module and the cooling device along the cooling air route.

6. The projector with air cleaning functionality of claim 5, wherein the cooling device is positioned between the photo catalyst material and the air inlet along the cooling air route.

7. A projector with air cleaning functionality, comprising:
   a cooling device for sending air outside the projector through an air inlet into the interior of the projector as cooling air to absorb heat generated inside the projector and sending heated cooling air out of the projector through an air outlet so as to form a cooling air route;
   a tourmaline, being installed inside the projector;
   a lamp module, being positioned between the tourmaline and the air outlet along the cooling air route and providing a light; and an optics processing part for using the light emitted from the lamp module to project an image signal onto a screen.

8. The projector with air cleaning functionality of claim 7, further comprising a power supply part, a signal processing part, and a control part.

9. The projector with air cleaning functionality of claim 7, wherein the tourmaline is positioned between the lamp module and the cooling device along the cooling air route.

10. The projector with air cleaning functionality of claim 9, wherein the cooling device is positioned between the tourmaline and the air inlet along the cooling air route.

* * * * *